United States Patent Office 2,789,045
Patented Apr. 16, 1957

2,789,045

SUPERPHOSPHATE AND PROCESS FOR THE MANUFACTURE OF THE SAME

George G. Stier, West Orange, and George D. Conover, Passaic, N. J., assignors to Nopco Chemical Company, Harrison, N. J., a corporation of New Jersey No Drawing. Application November 30, 1953, Serial No. 395,287

18 Claims. (Cl. 71—40)

This invention relates, in general, to the manufacture of superphosphate. More particularly, the invention relates to an improvement in the process by which superphosphate is ordinarily produced.

Superphosphate has been manufactured on a commercial scale in this country for almost a century. During this period, the industry has grown to such an extent that, at the present time, the quantity of superphosphate produced annually in the United States far exceeds the annual production level achieved by most other countries in the world. Superphosphate for fertilizer is manufactured almost exclusively from phosphate rock and hence, as might be expected, industrial superphosphate production consumes by far the largest proportion of phosphate rock produced in this country. The remainder of this rock is employed chiefly in the production of other industrial phosphate compounds.

Superphosphate is produced by one of a variety of processes which will be referred to herein, collectively, as the den processes. Basically, all of these processes involve the conversion of phosphate rock into superphosphate with sulfuric acid. These processes differ from each other chiefly in the type of equipment used in the various steps. The name of the process is derived from the large receptacle or den into which the mixture of phosphate rock and acid is discharged after the initial mixing. In a typical den process, the phosphate rock to be employed is initially prepared for conversion to superphosphate by grinding, or by otherwise dividing it, into relatively small pieces. After grinding, the rock and sulfuric acid are added to and admixed in a pan mixer in predetermined proportions. The ratio of sulfuric acid to phosphate rock used in this step of the process will vary to some extent depending upon the concentration of the acid and the composition of the rock in use. Generally, however, about four parts by weight of acid are used in the reaction for each five parts of ground rock present. The acidulation reaction which ensues is exothermic and, hence, the application of heat from an external source is not at all necessary to initiate the reaction. After being mixed for a period of from about two to three minutes or less in the pan mixer, the mixture of acid and phosphate rock is discharged by gravity into the den wherein the reaction proceeds exothermically. The acidulated mass is allowed to remain in the den for a period of time which is ordinarily in excess of about six hours. The actual time the material remains in the den will, for the most part, depend upon the procedure preferred by the particular manufacturer. The acidulation reaction goes well toward completion during the six or more hours that the acid-phosphate rock mixture is in the den. At the end of this period, the reaction mass is removed from the den and is stored in huge bulk piles where the exothermic reaction, now proceeding quite slowly, proceeds to completion. The duration of the period over which the reacting mass is piled, sometimes referred to as the curing interval, will vary. The materials will, however, be piled until sample analysis reveals that the mass contains a certain definite percentage of available phosphoric acid. Generally, the curing interval is a period of from about four weeks to about sixteen weeks or more. Following the curing interval, the superphosphate produced is prepared either for compounding with other fertilizer material or for sale to other fertilizer producers who are not superphosphate manufacturers.

Although a den process is employed in the production of by far the largest percentage of superphosphate manufactured in this country today, the process would, and could, be substantially improved by the elimination of certain undesirable aspects which inhere therein. In the first place, the rate at which the reaction between the phosphate rock and the acid proceeds is impaired by the high surface tension of the relatively concentrated sulfuric acid which is employed as the acid reactant. The reaction is facilitated to some extent, of course, by grinding the phosphate rock prior to the addition of the acid thereto. However, despite the fact that grinding supplies greater surface area of rock and insures greater and more intimate contact between the rock and the acid with the result that the reaction proceeds quite rapidly at the outset, superphosphate having specifications within the desired ranges is obtained usually only after curing the mass for several months. Furthermore, the physical characteristics of the superphosphate produced by a den process leave much to be desired. Thus, during the curing interval, while the reacting mass is stored in huge bulk piles, the mass becomes extremely hard and rocklike. When, finally, substantially complete conversion of the mass to superphosphate is accomplished, the piled superphosphate is such that, ordinarily, it can be removed from the curing area for further processing only after the pile has been broken up, as for example, by blasting with dynamite. The superphosphate blocks or chunks obtained by blasting are, thereafter, milled or ground to a particle size which is more suitable for use in fertilizer formulation. However, the necessity for blasting the mass prior to further processing of it is not the only disadvantage which accrues from the rock-like nature of the huge superphosphate pile. It has been found that this characteristic of the pile makes it extremely difficult, and at times even totally impossible, to control adequately the moisture content of the superphosphate produced. Thus, for example, the material closest to the surface of the pile will, most often, be found to contain substantially less water than the material which is further removed from the surface. Another aspect of the process which is of vital concern both to those engaged in the manufacture of superphosphate and to their customers who use superphosphate is the fact that superphosphate tends to harden and cake even after it has been ground or milled into relatively small sized particles. It has been found that if allowed to stand at ordinary room temperatures and atmospheric pressure for extended periods of time, superphosphate, either bagged as such or in admixture with other fertilizer materials, cakes and forms large, hard, rock-like particles. Various proposals have been made to commercial superphosphate manufacturers by those skilled in the art as to the manner in which the deficiencies which inhere in the den process can be eliminated or, at least, minimized. Certain of these proposals have provided a means for preventing the caking of the superphosphate particles which are obtained after grinding. As yet, however, no single means has been devised and found suitable for substantially eliminating all of the disadvantages which inhere in, and reduce the efficiency of, the process by which superphosphate is produced.

The object of this invention is to provide an improvement in the process by which superphosphate is generally prepared.

More particularly, it is the object of this invention to provide a means for decreasing the time required to achieve complete conversion of phosphate rock into superphosphate and for minimizing the tendency of superphosphate to cake and harden both during the curing interval involved in the manufacture of superphosphate and when ultimately packaged or bagged.

Other objects of this invention will be obvious and will in part appear hereinafter.

We have found that the incorporation of a product produced by condensing ethylene oxide with an amino substituted amide into the relatively concentrated sulfuric acid employed in the production of superphosphate substantially improves both the process by which superphosphate is manufactured and the physical characteristics of the superphosphate produced.

The condensation products which are employed in the practice of this invention are those products which are produced by condensing amino substituted amides with ethylene oxide. The ratio of ethylene oxide to the amino substituted amide employed in the preparation of these condensates can be varied greatly. In all cases at least one mole of ethylene oxide will be present for, and reacted with, each mole of amino amide present. However, condensation products produced by reacting up to 100 moles of ethylene oxide, or more for each mole of amino substituted amide can be employed in the process. The condensates preferably employed are those which have been prepared by reacting one mole of amino substituted amide with from about 4 to about 30 moles of ethylene oxide. The amides used in the production of these condensation products are aliphatic amides, or mixtures thereof, which contain a free primary or secondary amino group. These amides are prepared by reacting, in appropriate quantities, polyamines or mixtures of polyamines with fatty acids having a carbon chain length of from about 6 to about 30 carbon atoms, preferably from about 12 to about 22 carbon atoms, or with a mixture of such fatty acids. Thus, for example, mono-amides prepared from ethylene diamine or ethanol ethylene diamine; mono- or di-amides prepared from diethylene triamine; and mono-, di- or triamides prepared from triethylene tetramine etc.; and amino amides prepared from hexaethylene heptamine, can be used in the preparation of the condensation products employed. The fatty acid portion of the amide radical can be supplied by fatty acids, such as, lauric acid, palmitic acid, stearic acid, oleic acid, etc. and mixtures thereof. Moreover, an amide of the type produced by reacting an amine, such as, hexaethylene heptamine with, for example, sperm oil or mixtures of sperm oil with fatty acids is also well suited for use.

The ethylene oxide-amino-substituted amide condensation products used in the improved process described herein can be prepared by any suitable process known in the art. The condensates employed in the preferred embodiment of the invention, however, are those prepared by condensing a suitable amino amide with ethylene oxide at relatively low temperatures and low pressures. It has been found that condensation products which are highly satisfactory in every regard are produced by a method disclosed and claimed in copending application Serial No. 183,102 of Kelley and Levy now Patent #2,681,354. In this process, low temperature and low pressure condensation of ethylene oxide and amino substituted amides is achieved through the use of a catalyst, such as, boron trifluoride etherate or boron trifluoride hydrate. However, since the actual preparation of the condensate used is not within the scope of the present invention and since numerous methods are available for the production of these condensation products, the present invention should not be construed as limited to the use of condensation products produced by any particular method.

The quantity of ethylene oxide-amino-substituted amide condensate required in any particular instance to bring about completely satisfactory results will vary to some extent. There are, however, at least two factors which are of particular importance in determining the amount of condensate to be used in any particular instance. The first of these is the concentration of the sulfuric acid to be used. Ordinarily, 62% to 71% sulfuric acid is employed in the den processes. The second factor to be considered in determining the quantity of condensate to be incorporated into the acid is the composition of the particular phosphate rock which is to be converted into superphosphate. The composition of commercial phosphate rock varies according to the location from which the rock was obtained. The rock is graded according to the tricalcium phosphate or bone phosphate of lime (B. P. L.) content thereof. The bone phosphate of lime content of the rock produced in this country and used in the production of superphosphate varies, but, ordinarily, rock having a B. P. L. content within the range of from about 68% to about 77% is employed. Another factor which undoubtedly exerts an effect upon the quantity of condensate employed in any particular case is the precise composition of the condensation product which is employed. Generally, therefore, the percentage of condensate needed to bring about a desired result can best be determined, experimentally, by the particular superphosphate manufacturer. However, it has been found that in the production of superphosphate using 77% B. P. L. phosphate rock and about 70% sulfuric acid, the process, and the product produced therein, is materially improved when as little as about 0.025% by weight of the ethylene oxide-amino amide condensation product, based on the weight of the acid, is added to, and dissolved in, the acid prior to the treatment of the rock therewith. However, quantities in excess of this amount can be employed, if desired, as, for example, up to about 1.0% by weight or more based upon the weight of the acid employed. However, since the results which are obtained when larger quantities of condensates are used as, for example, 0.5% to about 1.0% by weight, do not substantially improve upon the results obtained using lesser quantities of ethylene oxide-amino amide condensation products, seldom, if ever, will it be necessary to incorporate into the acid more than about 0.5% by weight of the condensate to achieve the desired result.

When proceeding in accordance with the present invention no material changes in the conventional den processes for manufacturing superphosphate are necessary. The practice of the present invention does not require the use of any special equipment not already available to, and ordinarily used by, superphosphate manufacturers nor does it involve any operations or techniques not already familiar to the average operating personnel employed by the superphosphate manufacturers. This invention contemplates the use of the ethylene oxide-amino amide condensates in the production of superphosphate from phosphate rock containing from about 68% to about 77% B. P. L. content and sulfuric acid having about a 62% to about 71% concentration as well as in the production of superphosphate from phosphate rock and sulfuric acid, the specifications of which do not fall precisely within these limits. However, although the invention is fully operative using materials having specifications within and approximating the ranges set forth herein, in certain instances, the results obtained will be more outstanding than in others. The differences in the results observed are, in all probability, attributable to inherent differences in the composition of the various types of phosphate rocks used. This theory has not been proven, however. In all cases, however, the results accruing from the acidulation of phosphate rock in the manner disclosed herein, that is, in the presence of an ethylene oxide-amino amide condensation product, are substantial improvements over those which accrue when the acidulation reaction is carried out in the conventional manner.

A distinct advantage of the present invention resides in the fact that the time required to accomplish substantially complete conversion of phosphate rock into superphosphate is materially shortened. Thus, by the practice of the present invention, the superphosphate manufacturer is afforded an opportunity to reduce the time required to obtain a finished batch of superphosphate and thereby to increase his production potential. The cost to the consumer of a given quantity of superphosphate is determined by the available phosphoric acid (A. P. A.) content of the batch purchased so that as the A. P. A. content of a batch is increased, the value of the batch is similarly increased. As used in the superphosphate and fertilizer industries, the expression "available phosphoric acid" indicates that portion of superphosphate which is considered to be available to the use of the plant. The available phosphoric acid content is the difference, in percentages, between the total phosphoric acid content of the superphosphate mass and that portion thereof which is insoluble in ammonium citrate solution. The prime objective of the producer, therefore, is to produce superphosphate in such a manner that the highest possible available phosphoric acid content is achieved in the shortest possible time. The present invention provides a means for obtaining superphosphate, having a desired available phosphoric acid content, in a period of time which is substantially shorter than that required when the acidulation procedure of the ordinary den processes is employed. However, although this feature is one of the primary advantages accruing from the practice of the present invention, other significant benefits are also obtained. Thus, whereas the superphosphate mass obtained in the curing step of conventional den processes is a hard rock-like mass, superphosphate produced by the improved process disclosed herein is, at the end of the curing interval, a softer and more friable mass. As a result of this, the conventional prior art step of blasting the bulk pile with dynamite is completely obviated. Moreover, due to the friability of the mass, a far more accurate control of the moisture content of each batch is possible. Furthermore, superphosphate produced in the manner set forth herein is superior to superphosphate produced by conventional den processes in that it is neither hardens nor cakes, nor shows any tendency whatsoever to do so, when packaged or bagged.

For a fuller understanding of the nature and objects of this invention, reference should be had to the following examples which are given merely as further illustrations of the invention and are not to be construed in a limiting sense. All parts are given by weight.

*Example I*

In this example, three one pound samples of ground phosphate rock were weighed out into large glass beakers. Each sample of phosphate rock had a bone phosphate of lime content of about 77%. Thereafter, 362.4 grams of sulfuric acid (66%) were weighed out into each of three separate and clean glass beakers. To one of the acid-containing beakers, 0.72 gram of an ethylene oxide-amino amide condensate was added. To another of the acid-containing beakers, 1.81 grams of the same condensate were added. In each instance, the condensate employed was a product prepared by condensing, in the presence of boron trifluoride etherate catalyst, about 66.0 parts of ethylene oxide and 34.0 parts of amino-amide, said amide being the reaction product of about 41.0 parts of hexaethylene heptamine and 59.0 parts of sperm oil, all of said parts being given by weight. The acid which was weighed into the third beaker was to be used for control purposes and, hence, no condensate was added thereto.

The acid containing no condensate was poured slowly into and thoroughly admixed with one of the one pound samples of phosphate rock. The beaker containing this mixture was designated as beaker #1. The acid containing 0.72 gram of condensate was poured into the beaker containing the second one pound sample of phosphate rock. The beaker containing this mixture was designated as beaker #2. The acid containing 1.81 grams of condensate was poured into the third beaker containing a one pound sample of phosphate rock. The beaker containing this mixture was designated as beaker #3. In all three cases, reaction commenced upon adding the acid to the rock and stirring the mixture. However, more vigorous evolution of gas and a greater tendency to foam, was noted in beakers #2 and #3 indicating that the reaction taking place therein was proceeding at a faster rate than the control reaction being carried out in beaker #1.

The reaction in each beaker was allowed to proceed, undisturbed, for six hours. At the end of this time, a sample of the reaction mass in each beaker was taken and the available phosphoric acid content present therein determined. The reaction taking place between the materials in the unsampled masses was allowed to proceed undisturbed. The procedure employed in this determination is set out, in full, in the standard reference, Official Methods of Analysis of the Association of Official Agricultural Chemists, Seventh Edition, 1950, published by the Association of Official Agricultural Chemists, Washington, D. C. This procedure is disclosed on pages 10 and 11 of this reference under the headings "Citrate-Insoluble Phosphoric Acid-Official" and "Citrate-Soluble and Available Phosphoric Acid-Official." It was determined by this method that the reaction mass in beaker #1, that is, the control reaction had an available phosphoric acid content of 8.06% whereas the reaction masses sampled from beakers #2 and #3 had available phosphoric acid contents of 9.86% and 9.66%, respectively. With regard to these results it is pointed out that the available phosphoric acid present at the end of six hours in each of these three samples is far below the normal available phosphoric acid content that would be present in a batch prepared on a large scale production basis. The explanation for this is believed to be at least twofold. In the first place the phosphate rock used in conducting this example had a particle size which was larger than that of phosphate rock normally used in the industry. As a result of this, the reaction would in each case be expected to proceed more slowly. Secondly, since, in the industry, superphosphate is produced in ton or multi-ton batches, the heat developed in the industrial reaction is dissipated to a far lesser extent than it is in a laboratory scale experiment. Therefore, since on a laboratory scale, the temperature of the mass is normally lower than that of a commercial size batch, the available phosphoric acid content of the mass produced in the laboratory would, at the end of six hours, be expected to be lower than that of the mass produced in large scale commercial production. However, the fact that the masses in beakers #2 and #3 contained a higher percentage of available phosphoric acid than the control sample clearly demonstrates that, when carried out in the presence of the condensation products which we use herein, the reaction of phosphate rock and sulfuric acid proceeds at a more rapid rate.

Samples of the reaction mass present in each of the three beakers were taken once again after the reaction had proceeded for a period of fourteen days. These samples were, thereafter, analyzed by the procedure referred to heretofore to determine the available phosphoric acid present in each of the superphosphate masses. This determination revealed that the reaction mass in beaker #1, the control reaction, had an available phosphoric acid content of 18.76% whereas the masses present in beaker #2 and beaker #3 had an available phosphoric acid content of 19.16% and 19.06% respectively. It was also observed at this time that, whereas the reaction mass present in beaker #1, the control reaction, contained rather large and rock-like particles, the superphosphate in beakers #2 and #3 was friable and pulverulent and contained no large rock-like particles whatsoever.

Thus, the tendency of the mixture of phosphate rock and acid in beakers #2 and #3 to froth and foam when mixed, and the vigorous evolution of gases from the mixtures in beakers #2 and #3, as compared to the relatively moderate evolution of gases from the control sample were indicative of the fact that the reactions taking place in the presence of the condensation products were proceeding more rapidly than in the control beaker. This conclusion was confirmed by the determination of the available phosphoric acid content of each mass at the end of six hours and after two weeks. Furthermore our laboratory work shows that when a condensate is used in the production of superphosphate the product obtained is softer and more friable than the product obtained in the control reaction. These results have been confirmed by large scale plant runs carried out by commercial superphosphate producers. The commercial producers have found that the mixture of phosphate rock and sulfuric acid containing this condensation product tends to foam and froth, and that when the condensate is used in the production of superphosphate the evolution of gas is much more vigorous than they normally encounter. From these observations they concluded that the phosphate rock was being converted into superphosphate at a rate much more rapid than normal. Analysis of their batches for available phosphoric acid at various intervals has confirmed these conclusions. Furthermore, these manufacturers have found that at the end of the curving interval the product obtained was softer and considerably more friable than the product of the control reaction and that products produced by our process do not tend to harden or cake when mixed with other fertilizer materials.

*Examples II and III*

In these examples, three one pound samples of very finely ground phosphate rock were charged into separate vessels. Each sample of phosphate rock had a bone phosphate of lime content of about 77%. Thereafter, 362.4 grams of 66% sulfuric acid was weighed out into each of three clean beakers. To one of these latter beakers 0.72 gram of a condensation product was added, said product having been prepared by condensing, in the presence of boron trifluoride etherate catalyst, about 66.0 parts of ethylene oxide with about 34.0 parts of amino amide, said amide being the reaction product of a mixture of about 47.0 parts of sperm oil and 16.0 parts of oleic acid with a mixture of about 19.0 parts of diethylene triamine and about 19.0 parts triethylene tetramine, all of said parts being by weight. To another of the acid-containing beakers, 0.72 gram of a condensate, produced by reacting, in the presence of boron trifluoride etherate catalyst, about 67.0 parts of ethylene oxide with about 33 parts of amino amide, said amide being the reaction product of about 77.0 parts of oleic acid and 28 parts of ethanol ethylene diamine all of said parts being by weight, was added. The acid which was weighed into the third beaker was to be used for control purposes, and, hence no condensate was added thereto.

The acid containing no condensate was poured slowly into, and thoroughly mixed with, one of the one pound samples of phosphate rock. The beaker containing this mixture was designated as beaker #1. The acid containing 0.72 gram of the ethylene oxide condensate of the mixed amino amide of diethylene triamine and triethylene tetramine and sperm oil and oleic acid was poured into the beaker containing the second one pound sample of phosphate rock and admixed therewith. The beaker containing this mixture was designated as beaker #2. The acid containing the ethylene oxide condensate of the amino amide of ethanol ethylene diamine and oleic acid was poured slowly into the beaker containing the third one pound sample of phosphate rock and admixed therewith. The beaker containing this mixture was designated as beaker #3. In each case an immediate reaction commenced when the acid was added to the rock. However, the foaming and frothing of, and the more vigorous evolution of gas from, the reacting mass in both beakers #2 and #3 indicated that the reaction occurring therein was proceeding at a faster rate than the reaction taking place in beaker #1, in which there was no foaming or frothing whatsoever.

The reaction in each beaker was allowed to proceed undisturbed for six hours. At the end of this time a sample of the reaction mass present was taken from each beaker. The mass remaining in each of the three beakers was allowed to remain undisturbed. The available phosphoric acid content of each sample taken was thereafter determined by the method described in the reference Official Methods of Analysis of the Association of Official Agriculture Chemists, referred to in Example I. The sample taken from beaker #1, the control reaction product, had at the end of six hours an available phosphoric acid content of 17.1%. The sample taken from beaker #2, at the end of six hours had an available phosphoric acid content of 19.0% while at the end of the same period the sample taken from beaker #3 had an available phosphoric acid content of 18.1%.

The masses in each of the beakers were analyzed for available phosphoric acid content after the reaction had been allowed to proceed for twelve days. At the end of this time the reaction mass in beaker #1 had an available phosphoric acid content of 19.6%; the reaction mass in beaker #2 had an available phosphoric acid content of 19.5%; and the reaction mass in beaker #3 had an available phosphoric acid content of 20.0%.

At the end of this twelve day period it was observed that, whereas reaction mass present in beaker #1, the control reaction, contained rather large and rock-like particles, the masses in beakers #2 and #3 were friable and pulverulent and contained no large rock-like particles whatsoever.

*Examples IV and I*

In these examples superphosphate was produced from finely ground phosphate rock (B. P. L. 77%) and sulfuric acid (66%) in the manner described in Examples II and III. In the present examples, however, the condensation products employed in the preceding two examples were replaced by two other suitable type materials. In these examples beaker #1 contained the control reaction materials, that is, phosphoric acid and sulfuric acid (66%), with no condensation product whatsoever being present. In beaker #2, a reaction between one pound of phosphate rock and 362.4 grams of sulfuric acid (66%), was carried out, said acid having dissolved therein 0.2% by weight, based on the weight of the acid, of a condensate produced by reacting, in the presence of boron trifluoride etherate, 70.7 parts of ethylen oxide and 29.2 parts of amino amide, said amino amide being the reaction product of 76.8 parts of oleic acid and 28.2 parts of diethylene triamine, all of said parts being by weight. In beaker #3, a reaction between one pound of phosphate rock and 362.4 grams of sulfuric acid (66%) was carried out, said acid having dissolved therein 0.2% by weight, based on the weight of the acid, of a condensate produced by reacting, in the presence of boron trifluoride etherate, 54.4 parts by weight of ethylene oxide and 49.5 parts by weight of amino amide, said amino amide being the mono amide prepared from coconut oil fatty acids and hexaethylene heptamine.

On mixing the sulfuric acid with the phosphate rock an almost immediate evolution of gas was noted. The evolution of gas from the reaction being carried out in beakers #2 and #3 was more pronounced than from the reaction occurring in beaker #1. The reaction mass in both beakers #2 and #3 foamed and frothed when mixed whereas, on mixing no foaming or frothing occurred in beaker #1. At the end of the first six hours, a sample of the mass was taken from each of the three beakers. The available phosphoric acid content of each sample was determined according to the procedure identified in Example I. The available phosphoric acid content of the mass present in beaker #1 was at the end of 6 hours, 17.1%, the available phosphoric acid content of the mass present in beakers #2 and #3 was 18.9% and 17.6% respectively. The difference between the available phosphoric acid content of the control mass and that of the masses in beakers #2 and #3 indicated that during the first 6 hours, the reaction between the phosphate rock and the acid was facilitated greatly by the presence of condensation products and indicated that a product having a given available phosphoric acid content would be obtained in a shorter time when the reaction was carried out in the presence of an ethylene oxide-amino amide condensation product.

At the end of the first six hours of reaction, the mass present in beakers #2 and #3 was soft and friable. At the end of the same period the mass present in beaker #1 was hard and cake-like.

Having described our invention what we claim as new and desire to secure by Letters Patent is:

1. A process which comprises reacting phosphate rock with sulfuric acid, said acid having dissolved therein a condensation product produced by reacting ethylene oxide with an amino amide having a replaceable amino hydrogen atom.

2. A process which comprises reacting phosphate rock with a relatively concentrated sulfuric acid, said acid having dissolved therein a condensation product produced by reacting ethylene oxide with an amino amide having a replaceable amino hydrogen atom.

3. The process of claim 2 wherein the phosphate rock employed has a bone phosphate of lime content of from about 68% to about 77% and wherein the acid used is sulfuric acid having a concentration of from about 62% to about 71%.

4. The process of claim 2 wherein the amino amide is a fatty acid amide of a polyamine, the fatty portion of the amino amide molecule having a carbon chain length of from 6 to 30 carbon atoms.

5. The process of claim 2 wherein the condensation product employed is produced by reacting the amino amide and ethylene oxide in a ratio of up to 100 moles of ethylene oxide for each mole of amino amide.

6. The process which comprises reacting phosphate rock, having a bone phosphate of lime content of from about 68% to about 77%, with sulfuric acid having a concentration of from about 62% to about 71%, said acid having dissolved therein a product produced by condensing ethylene oxide with an amino amide having a replaceable amino hydrogen atom, the condensation of said materials having been carried out in a ratio of from about 4 to about 30 moles of ethylene oxide for each mole of amino amide, said amide being a fatty acid amide of a polyamine, the fatty portion of the amide molecule having a carbon chain length of from 12 to 22 carbon atoms.

7. The process of claim 6 wherein the ethylene oxide-amino amide condensation product is the condensate of ethylene oxide with an amide produced from hexaethylene heptamine and sperm oil.

8. The process of claim 6 wherein the ethylene oxide-amino amide condensation product is the condensate of ethylene oxide with an amide produced from a mixture of diethylene triamine and triethylene tetramine and a mixture of sperm oil and oleic acid.

9. The process of claim 6 wherein the ethylene oxide-amino amide condensation product is the condensate of ethylene oxide with an amide produced from ethanol ethylene diamine and oleic acid.

10. The process of claim 6 wherein the ethylene oxide-amino amide condensation product is the condensate of ethylene oxide with an amide produced from diethylene triamine and oleic acid.

11. The process of claim 6 wherein the ethylene oxide-amino amide condensation product is the condensate of ethylene oxide with an amide produced from hexaethylene heptamine and coconut oil fatty acids.

12. In the process for the production of superphosphate by the reaction of phosphate rock with relatively concentrated sulfuric acid, the improvement which comprises adding to the sulfuric acid and dissolving therein, prior to admixing said acid with the phosphate rock, a condensation product produced by reacting ethylene oxide with an amino amide having a replaceable amino hydrogen atom.

13. In the process for the production of superphosphate by the reaction of phosphate rock with sulfuric acid, said acid having a concentration of from about 62% to 71%, the improvement which comprises adding to the sulfuric acid and dissolving therein, prior to reacting it with the phosphate rock, a condensation product produced by reacting ethylene oxide with an amino amide having a replaceable amino hydrogen atom.

14. In the process for the production of superphosphate by reacting phosphate rock, having a bone phosphate of lime content of from about 68% to about 77%, with sulfuric acid, said acid having a concentration of from about 62% to 71%, the improvement which comprises adding to the said acid and dissolving therein a condensation product produced by reacting ethylene oxide with an amino amide produced from hexaethylene heptamine and sperm oil.

15. In the process for the production of superphosphate by reacting phosphate rock, having a bone phosphate of lime content of from about 68% to about 77%, with sulfuric acid, said acid having a concentration of from about 62% to about 71%, the improvement which comprises adding to the said acid and dissolving therein a condensation product produced by reacting ethylene oxide with an amino amide produced from a mixture of diethylene triamine and triethylene tetramine and a mixture of sperm oil and oleic acid.

16. In the process for the production of superphosphate by reacting phosphate rock, having a bone phosphate of lime content of from about 68% to about 77%, with sulfuric acid, said acid having a concentration of from about 62% to about 71%, the improvement which comprises adding to the said acid and dissolving therein a condensation product produced by reacting ethylene oxide with an amino amide produced from ethanol ethylene diamine and oleic acid.

17. In the process for the production of superphosphate by reacting phosphate rock, having a bone phosphate of lime content of from about 68% to about 77%, with sulfuric acid, said acid having a concentration of from about 62% to about 71%, the improvement which comprises adding to the said acid and dissolving therein a condensation product produced by reacting ethylene oxide with an amino amide produced from diethylene triamine and oleic acid.

18. In the process for the production of superphosphate by reacting phosphate rock, having a bone phosphate of lime content of from about 68% to about 77%, with sulfuric acid, said acid having a concentration of from about 62% to about 71%, the improvement which comprises adding to the said acid and dissolving therein a condensation product produced by reacting ethylene oxide with an amino amide produced from hexaethylene heptamine and coconut oil fatty acids.

References Cited in the file of this patent

UNITED STATES PATENTS

| | | |
|---|---|---|
| 1,710,272 | Richter | Apr. 23, 1929 |
| 2,284,002 | Lontz | May 26, 1942 |
| 2,418,203 | Stauffer | Apr. 1, 1947 |
| 2,557,730 | Ettel | June 19, 1951 |
| 2,681,354 | Kelley et al. | June 15, 1954 |

OTHER REFERENCES

The American Potato Journal, An Evaluation of Sludge-Acid . . . Fertilizers, Brown et al., vol. 20, published April 1943, pages 89–95.